(12) United States Patent
Carr et al.

(10) Patent No.: US 6,517,620 B1
(45) Date of Patent: Feb. 11, 2003

(54) MONO-AZO DYES AND INKS FOR INK-JET PRINTING

(75) Inventors: Kathryn Carr, Manchester (GB); Mark Kenworthy, Manchester (GB); Paul Wight, Manchester (GB)

(73) Assignee: Avecia Limited, Blackley (GB)

( * ) Notice: Subject to any disclaimer, the term of this patent is extended or adjusted under 35 U.S.C. 154(b) by 151 days.

(21) Appl. No.: 09/581,296

(22) PCT Filed: Dec. 9, 1998

(86) PCT No.: PCT/GB98/03629

§ 371 (c)(1), (2), (4) Date: Jun. 12, 2000

(87) PCT Pub. No.: WO99/31182

PCT Pub. Date: Jun. 24, 1999

(30) Foreign Application Priority Data

Dec. 12, 1997 (GB) ............................................... 9726284

(51) Int. Cl.$^7$ .......................... C09D 11/00; C09D 11/02; C09B 29/09; B05D 1/26; B32B 3/00; B32B 27/14

(52) U.S. Cl. .............................. 106/31.48; 106/31.77; 106/496; 534/798; 427/466; 428/195

(58) Field of Search .......................... 106/31.48, 31.77, 106/496; 534/798; 427/466; 428/195

(56) References Cited

U.S. PATENT DOCUMENTS

| | | | | |
|---|---|---|---|---|
| 3,142,669 A | | 7/1964 | Feeman ........................ 534/862 |
| 4,726,844 A | * | 2/1988 | Greenwood ............... 106/31.48 |
| 4,777,248 A | * | 10/1988 | Greenwood ............... 106/31.48 |
| 5,721,344 A | * | 2/1998 | Baettig ........................ 534/776 |
| 5,844,100 A | * | 12/1998 | Baettig ..................... 106/31.48 |

FOREIGN PATENT DOCUMENTS

| | | |
|---|---|---|
| EP | 0 187 520 A2 | 7/1986 |
| EP | 0 755 984 A1 | 1/1997 |
| EP | 0 794 233 A1 | 9/1997 |
| WO | WO 96/24636 | 8/1996 |

* cited by examiner

Primary Examiner—Helene Klemanski
(74) Attorney, Agent, or Firm—Pillsbury Winthrop LLP

(57) ABSTRACT

A mono-azo compound of Formula (1) and salts thereof:

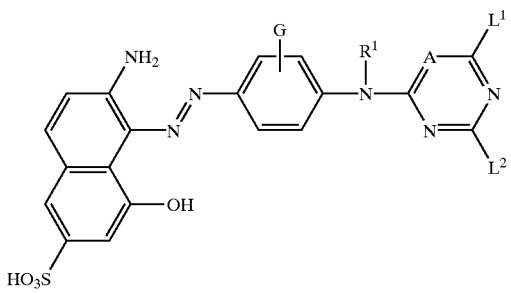

Formula (1)

wherein A, G, $L^1$, $L^2$, and $R^1$, are defined in the specification, have especially good light fastness and other advantageous properties. These dyes may be used in inks, especially inks for ink jet printing inks and in ink jet printing processes to print substrates and to in ink jet printer cartridges.

20 Claims, No Drawings

MONO-AZO DYES AND INKS FOR INK-JET PRINTING

This invention relates to dyes, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good waterfastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According to the present invention there is provided a mono-azo compound of Formula (1) and salts thereof:

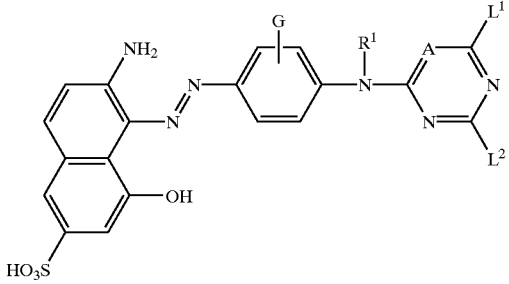

Formula (1)

wherein:

A is N, C—Cl, C—CN or C—$NO_2$;

$R^1$ is H or optionally substituted alkyl;

G is sulpho, carboxy, optionally substituted alkyl, optionally substituted alkoxy, —$CF_3$ or —$PO_3H_2$;

$L^1$ and $L^2$ are each independently —$SR^2$, —$OR^3$ or —$NR^4R^5$;

$R^2$, $R^3$, $R^4$ and $R^5$ are each independently H, or alkyl or aryl each of which is optionally substituted by a group other than sulphato or vinyl sulphone; or $R^4$ and $R^5$ together with the nitrogen to which they are attached form an optionally substituted five or six membered ring;

provided that:

(a) $L^1$ and $L^2$ are free from carboxy, sulpho and —$PO_3H_2$ groups;

(b) $L^1$ and $L^2$ are not both —$NH_2$; and (c) $L^1$ and $L^2$ are not both hydroxyethylamino.

The term mono-azo refers to a compound with one azo group (—N=N—).

Preferably A is N.

$R^1$ is preferably H or optionally substituted $C_{1-4}$-alkyl, more preferably H or $C_{1-4}$-alkyl optionally substituted by hydroxy, carboxy, sulpho or cyano. Examples include methyl, ethyl, n-propyl, iso-propyl, hydroxyethyl, cyanoethyl, sulphopropyl and carboxyethyl. It is especially preferred that $R^1$ is H.

G is preferably attached ortho to the azo group. Preferably G is —$SO_3H$, —COOH, —$CF_3$, alkyl (preferably optionally substituted $C_{1-4}$-alkyl), alkoxy (preferably optionally substituted $C_{1-4}$-alkoxy) or —$PO_3H_2$, more preferably —$SO_3H$, —COOH or —$CF_3$ and especially —$SO_3H$. Preferred optional substituents on G are selected from —OH, —COOH and —$NH_2$.

When $R^2$, $R^3$, $R^4$ or $R^5$ is optionally substituted alkyl it is preferably optionally substituted $C_{1-30}$-alkyl. The alkyl group my be straight-chain or branched-chain. When it is a branched-chain alkyl, it is preferably an α-branched alkyl group, for example —$CH(CH_3)CH_2CH_2CH_3$ or —$CH(CH_3)CH_2CH(CH_3)_2$. In one preferred embodiment the alkyl group is optionally substituted $C_{1-10}$-alkyl, more preferably optionally substituted $C_{1-6}$-alkyl and especially optionally substituted $C_{1-4}$-alkyl. In another preferred embodiment the alkyl group is optionally substituted $C_{5-20}$-alkyl, more preferably $C_{9-20}$-alkyl.

Preferred optional substituents on the alkyl groups represented by any of $R^2$, $R^3$, $R^4$ or $R^5$ include hydroxy, cyano, halo (especially F or Cl), nitro, $C_{1-6}$-alkoxy, $C_{1-6}$hydroxyalkoxy, a 5 or 6 membered heterocyclic group, a group represented by T, wherein T is an optionally substituted amino group and phenyl optionally substituted by one or more of $C_{1-10}$-alkyl, hydroxy, cyano, halo, nitro, $C_{1-6}$-alkoxy, $C_{1-4}$-hydroxyalkoxy or a group T. Especially preferred substituents on the alkyl group(s) are selected from hydroxy, a 5 or 6 membered heterocyclic group and a group represented by T.

Preferred 5 or 6 membered heterocyclic groups are optionally substituted furanyl and tetrahydrofuranyl, more preferably furanyl or tetrahydrofuranyl and especially furan-2-yl and tetrahydrofuran-2-yl.

Preferably T is a group of the formula —$NR^6R^7$ wherein $R^6$ and $R^7$ are each independently H, optionally substituted alkyl, —CO(alkyl), —CO(phenyl), or $R^6$ and $R^7$ together with the nitrogen to which they are attached form an optionally substituted morpholinyl, piperazinyl or piperidinyl ring.

When $R^6$ or $R^7$ is optionally substituted alkyl it is preferably optionally substituted $C_{1-20}$-alkyl, more preferably optionally substituted $C_{1-6}$-alkyl, and especially $C_{1-4}$-alkyl, for example methyl, ethyl, n-propyl and iso-propyl. Preferred optional substituents on $R^6$ and $R^7$ are selected from —OH and —$NH_2$.

When $R^6$ or $R^7$ is —CO(alkyl) it is preferably —CO($C_{1-6}$-alkyl), more preferably —CO($C_{1-4}$alkyl). For example —$COCH_2CH_3$ and —$COCH_2CH_2CH_3$.

When $R^6$ and $R^7$ together with the nitrogen to which they are attached form a substituted morpholinyl, piperidinyl or piperazinyl ring it is preferably substituted by $C_{1-4}$-alkyl, $C_{1-4}$-hydroxyalkyl, —CO($C_{1-4}$-alkyl) or a group of the formula —M—$NR^8R^9$ wherein M is an alkylene linking group and $R^8$ and $R^9$ each independently is H or $C_{1-6}$-alkyl optionally substituted by hydroxy or $C_{1-6}$-alkoxy. M is preferably $C_{1-6}$-alkylene, more preferably $C_{2-6}$-alkylene and especially —$(CH_2)_g$—, where g is from 2 to 6.

Further preferred groups represented by T include —$NH_2$; —NH($C_{1-30}$-alkyl) (preferably —NH($C_{1-6}$-alkyl)), for example ethylamino, —$NHCH(CH_3)CH_2CH_3$ and —$NHC_{16}H_{33}$; —N($C_{1-6}$-alkyl)$_2$, for example di-ethylamino; —NHCO($C_{1-4}$-alkyl), for example —$NHCOCH_3$ and —$NHCOCH_2CH_3$; —NH(Phenyl); morpholinyl optionally substituted by one or more $C_{1-4}$-alkyl groups, for example morpholinyl, 2,6-dimethylmorpholinyl and 2-methylmorpholinyl; piperazinyl; and substituted piperazinyl groups of the Formula (2):

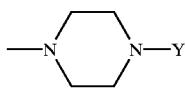

Formula (2)

wherein:

Y is $C_{1-4}$-alkyl, hydroxy-$C_{1-4}$-alkyl, —CO($C_{1-4}$-alkyl) or a group of the formula —M—NR$^8$R$^9$; and M, R$^8$ and R$^9$ are as hereinbefore defined.

Preferred groups of the Formula (2) include for example:

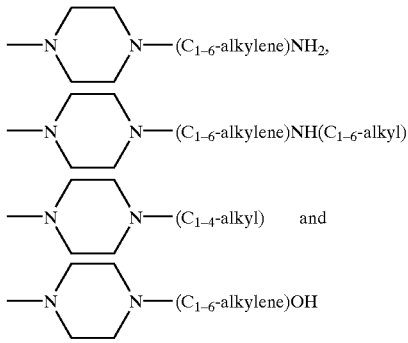

A preferred alkyl group substituted by T which may be represented by any of R$^2$, R$^3$, R$^4$ and R$^5$ is of the formula —(C$_d$H$_{2d}$)—T wherein d is 1 to 6, more preferably 2 to 6 and T is as hereinbefore defined.

A further preferred optionally substituted alkyl group represented by any of R$^2$, R$^3$, R$^4$ and R$^5$ is of the Formula (3):

Formula (3)

wherein:

R$^{10}$ is H or alkyl optionally substituted by —NH$_2$ or;

a and b are different and from 1 to 6;

p is from 1 to 4; and q is from 0 to 3.

Preferably R$^{10}$ is H or $C_{1-4}$-alkyl, more preferably H.

Preferably a and b are each independently 2 to 6, more preferably 2 or 3, p is 1 or 2 and q is 0.

Preferred groups of Formula (3) include —(C$_{2-6}$-alkylene)O(C$_{2-6}$-alkylene)OC$_{1-4}$alkyl, for example —C$_2$H$_4$OC$_2$H$_4$OCH$_3$, and —(C$_{2-6}$-alkylene)O(C$_{2-6}$-alkylene)OH, for example —C$_2$H$_4$OC$_2$H$_4$OH, —CH$_2$CH(CH$_3$)CH$_2$OC$_2$H$_4$OH and —C$_3$H$_6$OC$_2$H$_4$OH.

When R$^2$, R$^3$, R$^4$ or R$^5$ is optionally substituted aryl it is preferably optionally substituted phenyl or optionally substituted naphthyl, more preferably a group of the Formula (4) or (5):

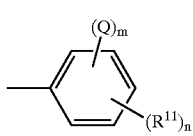

Formula (4)

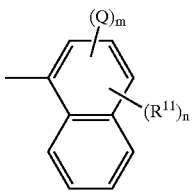

Formula (5)

wherein:
each R$^{11}$ independently is $C_{1-6}$-alkoxy, $C_{1-6}$-hydroxyalkoxy, hydroxy, halo (preferably F or Cl), nitro, amino, —COC$_{1-6}$-alkyl, —NHCOC$_{1-6}$-alkyl or —NHC$_{1-6}$-hydroxyalkyl;

each Q independently is optionally substituted $C_{1-30}$-alkyl or a group of the Formula —Z—Q$^1$;

each Z independently is a divalent linking group;

each Q$^1$ independently is optionally substituted $C_{1-30}$-alkyl;

n and m each independently is 0 to 5; and (n+m)=to 5.

m is preferably 0, 1 or 2, more preferably 1 or 2.

n is preferably 0 or 1.

(n+m) is preferably 1 to 3 more preferably 1 or 2.

Each R$^{11}$ is preferably $C_{1-4}$-alkoxy, hydroxy-$C_{1-4}$-alkyl, hydroxy or Cl.

Each Z is preferably independently selected from —O—, —S—, —NR$^a$—, —SO$_2$NR$^a$— and —SO$_2$—, wherein R$^a$ is H or $C_{1-30}$-alkyl optionally substituted by a group other than —COOH, —SO$_3$H or —PO$_3$H$_2$. Preferably R$^a$ is H or $C_{1-20}$-alkyl, more preferably H or $C_{1-6}$-alkyl and especially H.

Q and Q$^1$ may be a straight chain or branched chain alkyl group. When any of Q or Q$^1$ is a branched chain alkyl group it is preferably branched at the a-carbon. In a preferred embodiment Q and Q$^1$ are each independently optionally substituted $C_{1-4}$-alkyl. In a further preferred embodiment Q and Q$^1$ are each independently optionally substituted $C_{5-20}$-alkyl, more preferably $C_{9-20}$alkyl.

When any of Q or Q$^1$ is substituted, the substituents are preferably selected from hydroxy, cyano, halo (especially F or Cl), nitro, $C_{1-6}$-alkoxy, $C_{1-6}$-hydroxyalkoxy, a 5 or 6 membered heterocyclic group, or a group represented by T, wherein T is as hereinbefore defined. It is preferred, however, that Q and Q$^1$ are unsubstituted.

Preferably R$^4$ and R$^5$ are not both optionally substituted aryl.

When R$^4$ and R$^5$ together with the nitrogen to which they are attached form an optionally substituted 5 or 6 membered ring it is preferably an optionally substituted piperazinyl, piperidinyl or morpholinyl ring. The substituents are preferably selected from hydroxy, $C_{1-6}$-alkoxy, hydroxy-$C_{1-6}$-alkoxy, $C_{1-6}$-alkyl and $C_{1-6}$-alkyl substituted by hydroxy or a group represented by T as hereinbefore defined. More preferably the substituents are selected from $C_{1-6}$-alkyl or a group of the formula —$C_{1-6}$-alkylene-T. When R$^4$ and R$^5$ together with the nitrogen to which they are attached form a substituted piperazinyl ring it is preferably substituted on a nitrogen atom of the ring.

It is especially preferred that when R$^4$ and R$^5$ together with the nitrogen to which they are attached form a 5 or 6 membered ring it is morpholinyl or piperazinyl optionally substituted by $C_{1-4}$-alkyl or $C_{1-4}$-hydroxyalkyl.

Examples of preferred optionally substituted morpholinyl and piperazinyl rings which may be formed by R$^4$ and R$^5$ together with the nitrogen to which they are attached include:

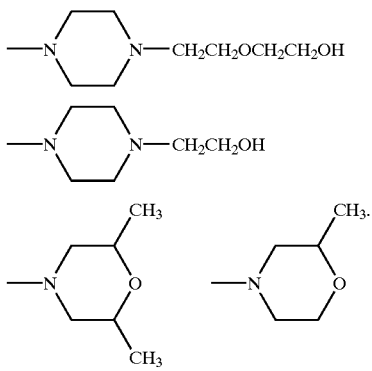

It is preferred that $R^2$, $R^3$, $R^4$ and $R^5$ each independently is H, $C_{1-30}$-alkyl optionally substituted by hydroxy, a 5 or 6 membered heterocyclic group or a group represented by T, or $R^4$ and $R^5$ together with the nitrogen to which they are attached form an optionally substituted morpholinyl, piperidinyl or piperazinyl ring.

When $L^1$ or $L^2$ is —$NR^4R^5$ it is preferably a group of the formula —$NHR^5$, morpholinyl or piperazinyl optionally substituted by $C_{1-6}$-alkyl or a group of the formula —($C_{1-6}$-alkylene)-T, wherein T and $R^5$ are as hereinbefore defined.

When $L^1$ and/or $L^2$ is a group of the formula —$NHR^5$ it is preferably of the formula —$NHR^b$, wherein $R^b$ is —($C_{1-6}$-alkylene)O($C_{1-6}$-alkylene)$OR^{10}$; a group of the Formula (4); or $C_{1-30}$-alkyl optionally substituted by furanyl, tetrahydrofuranyl, —OH, T, phenyl or phenyl substituted by one or more $C_{1-6}$-alkyl groups, wherein T, $R^{10}$ and Formula (4) are as hereinbefore defined. Preferably $R^b$ is $C_{1-30}$-alkyl optionally substituted by furanyl, tetrahydrofuranyl, —OH or T wherein T is as hereinbefore defined. More preferably $R^b$ is $C_{1-30}$-alkyl optionally substituted by two or more —OH groups. It is especially preferred that $R^b$ is $C_{1-6}$-alkyl optionally substituted by two to five —OH groups. A further preferred group of the formula —$NHR^b$ is of the formula —$NH(C_dH_{2d})$—T wherein d is 1 to 6.

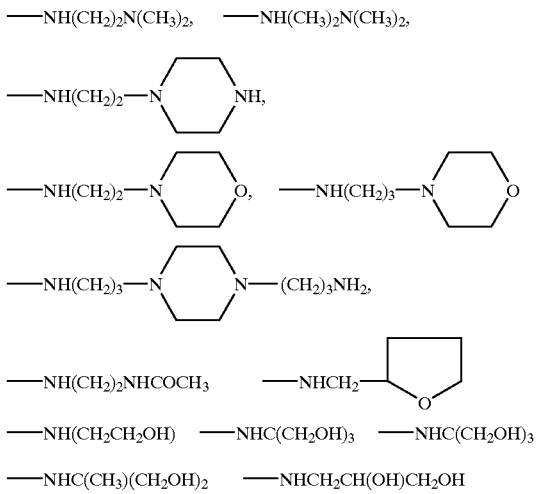

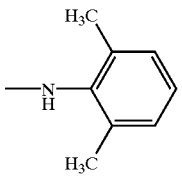

In view of the foregoing preferences, a first preferred embodiment of the present invention are compounds of the Formula (6) and salts thereof:

Formula (6)

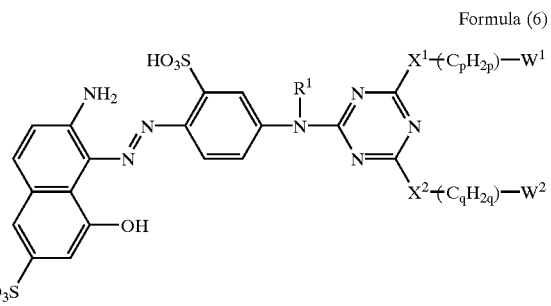

wherein:

$X^1$ and $X^2$ each independently is —O—, —S— or —$NR^{12}$;

$W^1$ and $W^2$ each independently is H, a group T, —$OC_{1-6}$-alkylene —$OR^{10}$, $C_{1-6}$-alkoxy, hydroxy, a 5 or 6 membered heterocyclic group or phenyl optionally substituted by one or more $C_{1-0}$-alkyl group(s);

$R^{12}$ is H or $C_{1-20}$-alkyl (preferably $C_{1-6}$-alkyl) optionally substituted by hydroxy, $C_{1-4}$-alkoxy; or a group T;

p and q each independently is 1 to 20; or $X^1$—($C_pH_{2p}$)$W^1$ and $X^2$—($C_qH_{2q}$)$W^2$ each independently form a piperazine or morpholine ring optionally substituted by $C_{1-4}$-alkyl, hydroxy-$C_{1-4}$-alkyl, —CO($C_{1-4}$-alkyl) or a group of the formula —M—$NR^8R^9$; and M, $R^1$, $R^8$, $R^9$, $R^{10}$ and T are as hereinbefore defined;

provided that:
(a) $W^1$, $W^2$ and $R^{12}$ are free from carboxy, sulpho and —$PO_3H_2$ groups; and
(b) the groups —$X^1$—($C_pH_{2p}$)—$W^1$ and —$X^2$—($C_qH_{2q}$)—$W^2$ are not both hydroxyethylamino.

In one preferred embodiment each p and q independently is from 1 to 6. In another preferred embodiment p and q independently is from 7 to 20, more preferably 9 to 20.

In a further preferred embodiment $W^1$ and $W^2$ each independently is H, a group T, —$OC_{1-6}$-alkylene —$OR^{10}$, $C_{1-6}$-alkoxy, hydroxy or a 5 or 6 membered heterocyclic group, wherein T and $R^{10}$ are as hereinbefore defined.

The compounds of Formula (6) provide prints which exhibit a particularly high light-fastness and good water-fastness when incorporated into inks for ink jet printing. The compounds of Formula (6) are also highly soluble which improves operability and reduces crusting when inks containing the compounds are used in an ink jet printer.

When $W^1$ or $W^2$ is a 5 or 6 membered heterocyclic group it is preferably piperazinyl, morpholinyl, furanyl or tetrahydrofuranyl, more preferably it is a morpholinyl, piperazinyl or tetrahydrofuran-2-yl group of the formula:

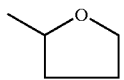

$R^{12}$ is preferably H or $C_{1-4}$-alkyl optionally substituted by hydroxy. It is especially preferred that $R^{12}$ is H.

When $—X^1—(C_pH_{2p})W^1$ or $—X^2—(C_qH_{2q})W^2$ form a piperazine or morpholine ring preferred optional substituents are $C_{1-4}$-alkyl, hydroxy-$C_{1-4}$-alkyl, or a group of the formula $—M—NR^8R^9$, more preferably methly ethyl and hydroxy-ethyl.

A second preferred embodiment of the present invention comprises a compound of Formula (6) and salts thereof wherein:

$X^1$ and $X^2$ are each independently $—NR^{12}—$ (preferably $—NH—$); and $W^1$, $W^2$, $R^1$, $R^{12}$, p and q are as hereinbefore defined; provided that:
(a) $W^1$, $W^2$ and $R^{12}$ are free from carboxy, sulpho and $—PO_3H_2$ groups; and
(b) The groups $—X^1—(C_pH_{2p})—W^1$ and $—X^2—(C_qH_{2q})—W^2$ are not both hydroxyethylamino.

A third preferred embodiment of the present invention comprises a compound of Formula (6) and salts thereof wherein:

$X^1$ and $X^2$ are each independently $—NR^{12}—$ (preferably $—NH—$);

$W^1$ and $W^2$ are each independently H, $—NH_2$, $—NR^{13}CO(C_{1-4}$-alkyl) $—OC_{1-6}$-alkylene-OH, $C_{1-6}$-alkoxy morpholinyl or tetrahydrofuranyl;

$R^{13}$ is H or $C_{1-4}$-alkyl; and $R^{12}$ is as hereinbefore defined;

provided that $W^1$, $W^2$ and $R^{12}$ are free from carboxy, sulpho and $—PO_3H_2$ groups.

A fourth preferred embodiment of the present invention comprises a compound of the Formula (7) or a salt thereof:

Formula (7)

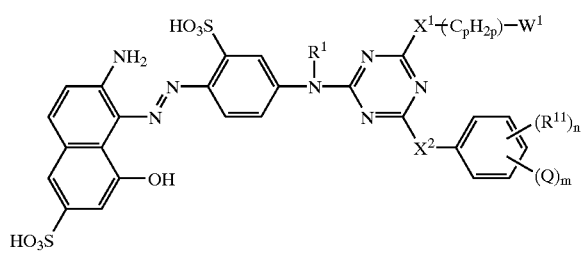

wherein:

$R^1$, $X^1$, $X^2$, $W^1$, Q, n, m and p are as hereinbefore defined;

provided that $W^1$, $X^1$, $X^2$ and each Q are free from carboxy, sulpho and $—PO_3H_2$ groups.

Especially preferred compounds of the Formula (7) are those wherein $R^1$ is H or $C_{1-4}$-alkyl; $X^1$ and $X^2$ are each independently $—S—$ or $—NR^{12}—$ (more preferably $—NH—$), wherein $R^{12}$ is as hereinbefore defined; $W^1$ is H, tetrahydrofuranyl, $—OH$, phenyl or phenyl substituted by one or more $C_{1-4}$ alkyl group(s); each Q independently is $C_{1-20}$-alkyl (more preferably $C_{1-4}$-alkyl); m is 0, 1 or 2; n is 0 or 1 and p is 1 to 20 (more preferably 5 to 20, and especially 9 to 20).

Further preferred compounds of Formula (7) are those wherein n=0 and each Q independently is $C_{1-4}$-alkyl, more preferably those wherein n=0, m is 0, 1 or 2, each Q independently is $C_{1-4}$-alkyl and $W^1$ is H. We have found that these compounds exhibit a high water-fastness.

A fifth preferred embodiment of the present invention comprises compounds of the Formula (1) and salts thereof wherein G is $—SO_3H$ and is attached ortho to the azo group; $L^1$ and $L^2$ independently are $—NHR^{14}$ wherein $R^{14}$ is $C_{1-30}$-alkyl optionally substituted by two or more $—OH$ groups (more preferably $C_{1-6}$-alkyl optionally substituted by two to five $—OH$ groups); and $R^1$ is H or $C_{1-4}$-alkyl.

The compounds of the invention may be in the free acid or salt form. Preferred salts are water-soluble, for example alkali metal salts, especially lithium, sodium and potassium salts, ammonium and substituted ammonium salts. Especially preferred alkali metal salts are those with sodium.

Especially preferred ammonium and substituted ammonium salts have cations of the formula $^+NV_4$ wherein each V independently is H or optionally substituted alkyl, or two groups represented by V are H or optionally substituted alkyl and the remaining two groups represented by V, together with the N atom to which they are attached, form a 5- or 6-membered ring (preferably a morpholinyl, pyridinyl or piperidinyl ring).

Preferably each V independently is H or $C_{1-4}$-alkyl, more preferably H, $CH_3$ or $CH_3CH_2$, especially H. Thus the cation is preferably ammonium (i.e. $^+NH_4$).

Examples of cations include $^+NH_4$, morpholinium, piperidinium, pyridinium, $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $CH_3CH_2CH_2N^+H_3$, $(CH_3)_2CHN^+H_3$, $N^+(CH_3)_4$, $N^+(CH_2CH_3)_4$, N-methyl pyridinium, N,N-dimethyl piperidinium and N,N-dimethyl morpholinium.

The compounds may be converted into a salt using known techniques. For example, an alkali metal salt of a compound may be converted into a salt with ammonia or an amine by dissolving an alkali metal salt of the dye in water, acidifying with a mineral acid and adjusting the pH of the solution to pH 9 to 9.5 with ammonia or the amine and removing the alkali metal cations by dialysis.

The present invention covers all tautomeric forms of the dyes shown in this specification, for example the hydrazo tautomers.

The present invention also covers mixtures comprising one or more compounds of the Formula (1); and mixtures comprising one or more compounds of the Formula (1) and one or more dye (preferably a magenta dye), other than a compound of Formula (1). For example a mixture comprising a compound of Formula (1) and one or more water-soluble magenta dyes selected from xanthene dyes, azo dyes (especially bis azo dyes).

The compounds of the invention may be prepared using conventional techniques for the preparation of azo dyes. For example a suitable method comprises condensing a compound of the Formula (8) with a compound of the Formula $L^2H$:

Formula (8)

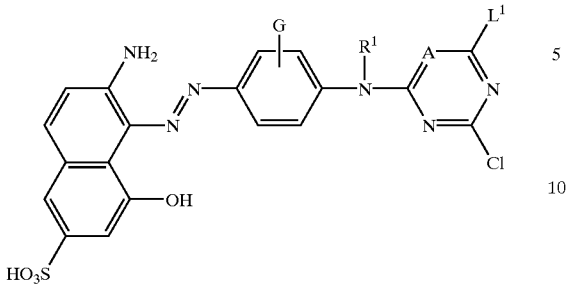

wherein A, $R^1$, G, $L^1$ and $L^2$ are as hereinbefore defined.

The condensation is preferably performed in a liquid medium, more preferably an aqueous medium and especially water. Temperatures of 15° C. to 100° C. are preferred, more preferably from 60 to 70° C. Preferably a reaction time of 1 to 48, more preferably 3 to 24 hours is used.

The condensation is preferably performed in the presence of a base. The base may be any inorganic base for example, ammonia, an alkali metal or alkali earth metal hydroxide, carbonate or bicarbonate, or an organic base. Preferred organic bases are tertiary amines for example, N-alkylated heterocycles, for example N—($C_{1-4}$-alkyl)morpholine, N—($C_{1-4}$-alkyl)piperidine, N,N'-di($C_{1-4}$-alkyl)piperazine; tri($C_{1-4}$-alkyl)amines, for example triethylamine, and optionally substituted pyridines, especially pyridine.

The amount of base used may be varied between wide limits but it is preferred to use less than 40, more preferably less than 10 and especially from 3 to 5 moles for each mole of the compound of Formula (8).

After the condensation the product may be isolated by precipitating the product as a salt from the reaction mixture for example by the addition of a suitable alkali metal salt, especially sodium chloride. Alternatively, the product may be isolated in its free acid form by acidifying the reaction mixture, preferably using a mineral acid, especially hydrochloric acid. Where the product precipitates as a solid it may be separated from the mixture by filtration.

If desired unwanted anions may be removed from the product of the above process by dialysis, osmosis, ultrafiltration or a combination thereof.

The product of the above process may be converted, if desired, to the $NH_4^+$, quaternary ammonium or organic amine salt by the addition of ammonia, ammonium hydroxide, primary, secondary, tertiary or quaternary amine. When the base used in the condensation process is an organic amine an excess may be used so that the compound of Formula (1) is formed as the organic amine salt.

The compound of the Formula (8) may be prepared using conventional techniques, for example by:

(1) diazotising the compound of the formula:

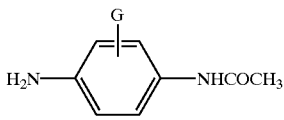

wherein G is as hereinbefore defined, to give the corresponding diazonium salt;

(2) coupling the diazonium salt from stage (1) with 2-amino-8-naphthol-6-sulphonic acid at a pH<7, preferably at a pH of from 3 to 5;

(3) alkaline hydrolysis of the product of stage (2) to remove the acetyl group;

(4) condensing the product from stage (1) with a compound of the formula:

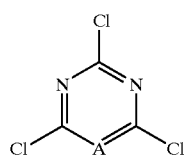

wherein A is as hereinbefore defined; and (5) condensing the product from stage (4) with approximately 1 molar equivalent of the compound of the formula $L^1H$.

The diazotisation in stage (1) is preferably performed in an aqueous medium at a pH below 7 in the presence of a suitable diazotisation agent. Dilute mineral acid, e.g. HCl or $H_2SO_4$, is preferably used to achieve the desired acidic conditions. Conveniently the diazotisation agent is formed in-situ, for example by dissolving an alkali metal nitrite, preferably sodium nitrite, in a molar excess of mineral acid, preferably HCl. Normally at least one mole of diazotisation agent per mole of the amine in stage (1), preferably from 1 to 1.25 moles will be used in the diazotisation.

The temperature of the diazotisation is not critical and may conveniently be carried out at from –5° C. to 20° C., preferably from 0 to 10° C. and especially from 0 to 5° C.

The hydrolysis in stage (3) is preferably performed at a pH in the range 9 to 14. The temperature during hydrolysis is preferably from 40 to 90° C.

The compounds of Formula (1) are useful as dyes, especially for the coloration of inks for ink jet printing.

According to a second aspect of the present invention there is provided an ink comprising:

(a) from 0.01 to 30 parts of a compound of the Formula (9); and (b) from 70 to 99.99 parts of a medium comprising a mixture of water and an organic solvent, an organic solvent free from water, or a low melting point solid; wherein all parts are by weight and the number of parts of (a)+(b)=100:

Formula (9)

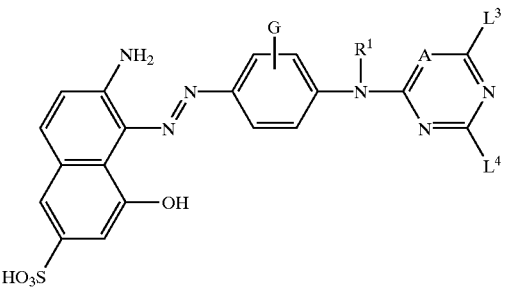

wherein:

$L^3$ is $L^1$ or a labile atom or group;

$L^4$ is $L^2$ or a labile atom or group;

A, $R^1$, G, $L^1$ and $L^2$ are as hereinbefore defined;

provided that:

(a) $L^3$ and $L^4$ are free from carboxy, sulpho and —$PO_3H_2$ groups; and (b) $L^3$ and $L^4$ are not both hydroxyethylamino.

When $L^3$ or $L^4$ is a labile atom or group, it is preferably an atom or group which is bound by a chemical bond to the compound of Formula (9) which is displaceable by a hydroxyl group of cellulose under mildly alkaline aqueous conditions to form a covalent bond between the compound of Formula (9) and cellulose.

Preferred labile atoms and groups represented by $L^3$ and $L^4$ include halogen atoms, for example F and Cl; thiocyano groups; quaternary ammonium groups, for example trialkylammonium groups and optionally substituted pyridinium groups.

Preferably $L^3$ is $L^1$ and $L^4$ is $L^2$ as hereinbefore defined.

In the inks according to the second aspect of the present invention the compound of Formula (9) is preferably of Formula (1), more preferably of Formula (6) or (7), as hereinbefore defined.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a mixture of water and an organic solvent or an organic solvent free from water, preferably component (a) is completely dissolved in component (b). Preferably component (a) has a solubility in component (b) at 20° C. of at least 10%. This allows the preparation of concentrates which may be used to prepare more dilute inks and reduces the chance of the compound of Formula (9) precipitating if evaporation of the liquid medium occurs during storage.

When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2ethoxyethoxy)ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

A preferred medium comprises:
(a) from 75 to 95 parts water; and
(b) from 25 to 5 parts in total of one or more solvents selected from diethylene glycol, 2-pyrrolidone, thiodiglycol, N-methylpyrrolidone, cyclohexanol, caprolactone, caprolactam and pentane-1,5-diol;

wherein the parts are by weight and the sum of the parts (a) and (b)=100.

Examples of further suitable ink media comprising a mixture of water and one or more organic solvents are described in U.S. Pat. Nos. 4,963,189, 4,703,113, 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the compound of Formula (9) in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$ chains, and sulphonamides. The compound of Formula (9) may be dissolved in the low melting point solid or may be finely dispersed in it.

The compounds of the Formula (9) exhibit a high solubility in aqueous media, accordingly it is preferred that the liquid medium is a mixture of water and one or more water miscible organic solvent(s).

The composition may also contain additional components conventionally used in ink jet printing inks, for example viscosity and surface tension modifiers, corrosion inhibitors, biocides, kogation reducing additives and surfactants which may be ionic or non-ionic.

The compounds of the Formula (9) may be, and preferably are, purified to remove undesirable impurities before they are incorporated into inks for ink jet printing. Conventional techniques may be employed for purifying the compounds, for example osmosis and/or dialysis.

When the inks according to the second aspect of the invention are used as ink jet printing inks, the ink preferably has a concentration of less than 100 parts per million, more preferably less than 50 parts per million, in total of undesirable ions, for example halide ions, silicon ions, peroxide radicals and divalent and trivalent metals.

A third aspect of the present invention provides a process for printing an image on a substrate comprising applying thereto an ink containing a compound of Formula (9) as hereinbefore defined by means of an ink jet printer.

The ink used in this process preferably comprises a composition as defined in the second aspect of the present invention.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character. Examples of commercially available treated papers include HP Premium Coated Paper (available from Hewlett Packard), HP Photopaper (available from Hewlett Packard), Stylus Pro 720 dpi Coated Paper, Epson Photo Quality Glossy Film (available from Seiko Epson Corp.), Epson Photo Quality Glossy Paper (available from Seiko Epson Corp.), Canon HR 101 High Resolution Paper (available from Canon), Canon GP 201 Glossy Paper (available from Canon), and Canon HG 101 High Gloss Film (available from Canon).

A fourth aspect of the present invention provides a paper, an overhead projector slide or a textile material printed with an ink according to the second aspect of the present invention, or by means of the process according to the third aspect of the present invention.

When the substrate is a textile material the ink according to the invention is preferably applied thereto by:

i) applying the composition to the textile material using an ink jet printer; and ii) heating the printed textile material at a temperature of from 50° C. to 250° C.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferably the textile material has been treated with an aqueous pretreatment composition comprising a thickening agent and optionally a water-soluble base and a hydrotropic agent and dried prior to step i) above.

The pre-treatment composition preferably comprises a solution of the base and the hydrotropic agent in water containing the thickening agent. Particularly preferred pre-treatment compositions are described more fully in European Patent Application No.534660A1.

A fifth aspect of the present invention provides an ink jet printer cartridge containing an ink, wherein the ink contains a compound of the Formula (9) as hereinbefore defined in relation to the second aspect of the present invention.

Preferably the ink in the ink jet printer cartridge is an ink according to the second aspect of the present invention.

The invention is further illustrated by the following Examples in which all parts and percentages are by weight unless otherwise stated.

EXAMPLE 1

Dye

Dye (1) was prepared using the process described below:

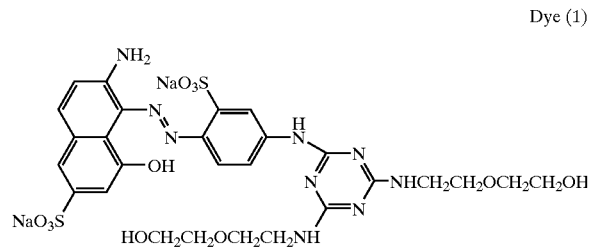

Dye (1)

Stage (1): Diazotisation and Coupling

To N-acetyl p-phenylenediamine sulphonic acid (0.5 moles) in water (400 ml) was added concentrated hydrochloric acid (250 ml) and the solution was cooled to 0–5° C. 2N sodium nitrite (250 ml) was added dropwise over 5 minutes with stirring. After 15 minutes, excess nitrous acid was destroyed by the addition of sulphamic acid (0.2 g). To the resulting suspension was added a solution of 2-amino-8-naphthol-6-sulphonic acid (0.5 moles in 600 ml of water at pH6) and the pH was adjusted to 4 by the addition of sodium acetate. The mixture was stirred at 0–5° C. for 4 hours before being allowed to warm to room temperature.

Stage (ii) Hydrolysis

The acetyl group present on the product of stage (i) was removed by alkaline hydrolysis by adding concentrated sodium hydroxide (200 ml) to the mixture resulting from stage 1 and heating at 70–80° C. for 1.5 hours.

After cooling to room temperature, the pH was adjusted to 7 by the addition of concentrated hydrochloric acid. Sodium chloride (20% weight/volume) was added and the precipitated solid was collected by suction filtration, washed with 30% brine and dried at 70° C. Yield 172.5 g (strength 52%).

Stage (iii) Condensation with Cyanuric Chloride

The product from stage (ii) (0.15 moles) was dissolved in water (500 ml) at pH7. Cyanuric chloride (0.17 moles) was dissolved in acetone (300 ml) and added dropwise over 10 minutes to the stirred solution at 0–5° C. The mixture was stirred for 40 minutes at this temperature.

Stage (iv) Further Condensation 2-aminoethyoxyethanol (0.5 mole) dissolved in water (400 ml) was added to the mixture from stage (iii). The pH of the reaction mixture was raised to 7 with 2N sodium hydroxide solution and this was maintained whilst the mixture was heated initially to 30–40° C. for 2 hours and finally to 40–50° C. and at a pH of 8.5–9 for 16 hours.

The mixture was cooled to room temperature and evaporated to dryness. The solid was slurried in methylated spirits, collected by suction filtration and washed with further methylated spirits.

Stage (v) Purification

The product of stage (iv) was redissolved in distilled water and dialysed using Visking tubing to a permeate conductivity of below 100 µS. The solution was evaporated to dryness. Yield 100 g.

Ink

Ink I was prepared by dissolving 2 parts of Dye (1) in 98 parts of a mixture comprising 90 parts water and 10 parts 2-pyrrolidone.

Ink Jet Printing

Ink I was loaded into an Hewlett Packard 560C ink jet printer and was printed onto HP Premium Glossy Paper (available from Hewlett Packard). The resulting print was a bright magenta which had a good optical density and excellent light fastness.

The optical density of the print was 2.29, as measured using an X-Rite densitometer.

The print exhibited a ΔE value of 3 and an optical density loss of 11% after 64 hours irradiation in the Atlas Weatherometer.

The prints had a chroma of 75, as measured using an X-Rite densitometer.

EXAMPLES 2 to 11

Dyes of the general formula:

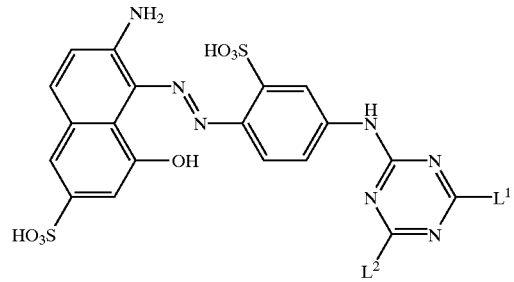

were prepared by condensing the product of stage (iii) in Example 1 with the compound of the formula $L^1H$, at a reaction temperature of 30–40° C. for 2 hours, wherein $L^1H$ is as shown in Table 1. The resultant product was then isolated by adding 10% NaCl solution and reducing the pH to 4.5 with 2N HCl.

The product of the above reaction (typically 0.13 moles) was then dissolved in dyes had the ΔE and reflected optical density (ROD) values shown in the final two column of Table 1.

TABLE 1

| Example | $L^1H$ | $L^2H$ | ΔE | ROD |
|---|---|---|---|---|
| 2 | $HN(C_2H_4OH)_2$ | $HN(C_2H_4OH)_2$ | 0.8 | 2.37 |
| 3 | $HN(C_2H_4OH)_2$ | Morpholine | 1.4 | 2.28 |
| 4 | $H_2NC_2H_4OH$ | $HN(C_2H_4OH)2$ | 6.2 | 2.19 |
| 5 | Morpholine | Morpholine | 1.9 | 1.03 |
| 6 | Morpholine | 1-(2-aminoethyl)piperazine | 4.3 | 2.28 |
| 7 | Morpholine | 4-(2-aminoethyl)morpholine | 2.6 | 2.07 |
| 8 | 4-(3-aminopropyl)morpholine | 4-(3-aminopropyl)morpholine | 3.1 | 2.56 |
| 9 | 4-(2-aminoethyl)morpholine | 4-(2-aminoethyl)morpholine | 2.4 | 2.24 |
| 10 | $H_2NC_2H_4NHC(O)CH_3$ | $H_2NC_2H_4NHC(O)CH_3$ | 3.1 | 2.08 |
| 11 | Tetrahydrofurfurylamine | Tetrahydrofurfurylamine | 1.2 | 2.04 |

EXAMPLES 12 to 45

Further dyes of the general Formula (A) were prepared by condensing the product of stage (iii) in Example 1 with the compound of the formula $L^1H$, followed by a further condensation with the compound $L^2H$, wherein $L^1H$ and $L^2H$ are shown in Table 2. The condensations were performed using analogous conditions to those described above for Examples 2 to 11.

The dyes provided bright magenta prints with a good optical density, water-fastness and high light-fastness when incorporated into inks which were applied to a paper substrate using an ink jet printer as described above in Example 1.

TABLE 2

| Example | $L^1H$ | $L^2H$ |
|---|---|---|
| 12 | H₂N-C(CH₂OH)₃ | H₂N-CH₂-CH(CH₃)-O- |

TABLE 2-continued

| Example | L¹H | L²H |
|---|---|---|
| 13 | 2-amino-2-(hydroxymethyl)propane-1,3-diol (tris) | 2-(2-aminoethoxy)ethanol |
| 14 | morpholine | hexylamine |
| 15 | morpholine | heptylamine |
| 16 | morpholine | octylamine |
| 17 | morpholine | nonylamine |
| 18 | 2-(methylamino)ethanol | 2-(2-aminoethoxy)ethanol |
| 19 | 2-(methylamino)ethanol | 2-(methylamino)ethanol |
| 20 | 3-amino-1,2-propanediol | — |
| 21 | 2-(methylamino)ethanol | — |
| 22 | 2-(isopropylamino)ethanol | — |

TABLE 2-continued

| Example | L¹H | L²H |
|---------|-----|-----|
| 23 | morpholine | H₃C-NH-CH₂CH₂-OH |
| 24 | H₂N-CH₂-CH(OH)-CH₂-OH | H₂N-CH₂-CH(OH)-CH₂-OH |
| 25 | HO-CH₂CH₂-O-CH₂CH₂-NH₂ | H₂N-CH₂-CH(OH)-CH₂-OH |
| 26 | H₃C-NH-CH₂CH₂-OH | H₂N-CH₂CH₂-OH |
| 27 | H₃C-NH-CH₂CH₂-OH | H₂N-CH₂CH₂-NH-C(O)-CH₃ |
| 28 | (H₃C)₂CH-NH-CH₂CH₂-OH | H₂N-CH₂CH₂-NH-C(O)-CH₃ |
| 29 | (H₃C)₂CH-NH-CH₂CH₂-OH | H₂N-CH₂CH₂-O-CH₂CH₂-OH |
| 30 | H₂N-CH₂CH₂-O-CH₂CH₂-OH | — |
| 31 | H₂N-CH₂CH₂-NH-C(O)-CH₃ | — |

TABLE 2-continued

| Example | L¹H | L²H |
|---|---|---|
| 32 | N-(2-aminoethyl)acetamide | 2-(2-aminoethylamino)ethanol |
| 33 | N-(2-aminoethyl)acetamide | 2-[2-(2-aminoethoxy)ethoxy]ethoxy-ethylamine |
| 34 | N-(2-aminoethyl)acetamide | 3-amino-1,2-propanediol |
| 35 | 3-amino-1,2-propanediol | 2-(2-aminoethylamino)ethanol |
| 36 | 3-amino-1,2-propanediol | 1-amino-1-deoxy-hexitol (meglumine-type) |
| 37 | 2-(isopropylamino)ethanol | 3-amino-1,2-propanediol |
| 38 | 2,4,6-trimethylaniline | — |
| 39 | 2-ethyl-6-methylaniline | — |

TABLE 2-continued

| Example | L¹H | L²H |
|---|---|---|
| 40 | 2-amino-3-methyl-6-isopropyl-benzene (H₃C, H₂N, H₃C-CH-CH₃ substituted benzene) | — |
| 41 | 2,6-dimethyl-4-methylaniline (H₃C, H₂N, CH₃, H₃C) | tetrahydrofurfurylamine (O-ring-CH₂-NH₂) |
| 42 | 2-amino-3-methyl-6-isopropyl-benzene | tetrahydrofurfurylamine |
| 43 | (CH₃)(CH₃)CH-CH₂-CH(CH₃)-NH₂ | 2,6-dimethyl-4-methylaniline |
| 44 | H₃C-C(CH₃)(CH₃)-CH₂-CH(CH₃)-CH₂-NH₂ | 2,6-dimethyl-4-methylaniline |
| 45 | H₃C-C(CH₃)(CH₃)-CH₂-CH(CH₃)-CH₂-NH₂ | 2-amino-3-methyl-6-isopropyl-benzene |
| 46 | (CH₃)(CH₃)CH-CH₂-CH(CH₃)-NH₂ | 2-amino-3-methyl-6-isopropyl-benzene |

A "—" in Table 2 indicates that a condensation was not performed (i.e. L² is —Cl)

EXAMPLES 47 to 55

Further dyes of the Formula (A) may be prepared by condensing the product of stage (iii) in Example 1 with the compound of the formula L¹H, followed by a further condensation with the compound L²H, wherein L¹H and L²H are shown in Table 3.

TABLE 3

| Example | L¹H | L²H |
|---|---|---|
| 47 | (CH₃)₂CHCH₂CH(NH₂)CH₃ (4-methylpentan-2-amine) | 2,6-dimethylaniline |
| 48 | H₂NC₁₆H₃₃ | 2,6-dimethylaniline |
| 49 | HSCH₂CH(CH₃)CH₂CH₃ (2-methylbutane-1-thiol) | 2,6-dimethylaniline |
| 50 | HSC₁₀H₂₁ | 2,6-dimethylaniline |
| 51 | H₂N(CH₂)₆CH₃ | 2,6-dimethylaniline |
| 52 | (CH₃)₂CHCH₂CH(NH₂)CH₃ | (CH₃)₂CHCH₂CH(NH₂)CH₃ |
| 53 | H₂NC₁₆H₃₃ | 2,6-dimethyl-4-methylaniline |
| 54 | (CH₃)₂CHCH₂CH(NH₂)CH₃ | H₂NCH(CH₃)₂ (isopropylamine) |
| 55 | 2-(sec-butyl)aniline | (CH₃)₂CHCH₂CH(NH₂)CH₃ |
| 56 | H₂NC₁₆H₃₃ | H₂NC₁₆H₃₃ |

EXAMPLE 57

The inks described in Tables 4 to 7 may be prepared wherein the Dye described in the first column is the Dye made in the above Example of the same number. Numbers quoted in the second column onwards refer to the number of parts of the relevant ingredient and all parts are by weight. The ink may be applied to paper by thermal or piezo ink jet printing.

The following abbreviations are used in Table 4 to 7:

PG=propylene glycol
DEG=diethylene glycol
NMP=N-methyl pyrrolidone
DMK=diethylketone
IPA=isopropanol
MEOH=methanol
2P=2-pyrrolidone
MIBK=methylisobutyl ketone
P12=propane-1,2-diol
BDL=butane-2,3-diol
CET=cetyl ammonium bromide
PHO=Na$_2$HPO$_4$ and
TBT=tertiary butanol
TDG=thiodiglycol

TABLE 4

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 2 | 2.0 | 80 | 5 | | 6 | 4 | | | | | 5 | |
| 4 | 3.0 | 90 | | 5 | 5 | | 0.2 | | | | | |
| 7 | 10.0 | 85 | 3 | | 3 | 3 | | | | 5 | 1 | |
| 5 | 2.1 | 91 | | 8 | | | | | | | | 1 |
| 1 | 3.1 | 86 | 5 | | | | | 0.2 | 4 | | | 5 |
| 1 | 1.1 | 81 | | | 9 | | 0.5 | 0.5 | | | 9 | |
| 3 | 2.5 | 60 | 4 | 15 | 3 | 3 | | | 6 | 10 | 5 | 4 |

TABLE 4-continued

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 4  | 5    | 65 |   | 20 |    |    |     |     | 10 |   |    |   |
| 3  | 2.4  | 75 | 5 | 4  |    | 5  |     |     |    | 6 |    | 5 |
| 7  | 4.1  | 80 | 3 | 5  | 2  | 10 |     | 0.3 |    |   |    |   |
| 8  | 3.2  | 65 |   | 5  | 4  | 6  |     |     | 5  | 4 | 6  | 5 |
| 9  | 5.1  | 96 |   |    |    |    |     |     |    | 4 |    |   |
| 6  | 10.8 | 90 | 5 |    |    |    |     |     | 5  |   |    |   |
| 1  | 10.0 | 80 | 2 | 6  | 2  | 5  |     |     | 1  |   | 4  |   |
| 3  | 1.8  | 80 |   | 5  |    |    |     |     |    |   | 15 |   |
| 10 | 2.6  | 84 |   |    | 11 |    |     |     |    |   | 5  |   |
| 4  | 3.3  | 80 | 2 |    |    | 10 |     |     |    | 2 |    | 6 |
| 11 | 12.0 | 90 |   |    |    | 7  | 0.3 |     | 3  |   |    |   |
| 6  | 5.4  | 69 | 2 | 20 | 2  | 1  |     |     |    |   | 3  | 3 |
| 7  | 6.0  | 91 |   |    | 4  |    |     |     |    |   | 5  |   |

TABLE 5

| Dye | Dye Content | Water | PG | DEG | NMP | CET | TBT | TDG | BDL | PHO | 2P | PI2 |
|---|---|---|---|---|---|---|---|---|---|---|---|---|
| 2  | 3.0  | 80 | 15 |    |    | 0.2  |     |     |   |      | 5  |    |
| 3  | 9.0  | 90 |    | 5  |    |      |     |     |   | 1.2  |    | 5  |
| 5  | 1.5  | 85 | 5  | 5  |    | 0.15 | 5.0 | 0.2 |   |      |    |    |
| 7  | 2.5  | 90 |    |    | 6  | 4    |     |     |   | 0.12 |    |    |
| 6  | 3.1  | 82 | 4  | 8  |    | 0.3  |     |     |   |      |    | 6  |
| 11 | 0.9  | 85 |    | 10 |    |      |     |     | 5 | 0.2  |    |    |
| 2  | 8.0  | 90 |    | 5  | 5  |      |     | 0.3 |   |      |    |    |
| 8  | 4.0  | 70 |    | 10 | 4  |      |     |     | 1 |      | 4  | 11 |
| 4  | 2.2  | 75 | 4  | 10 | 3  |      |     |     | 2 |      | 6  |    |
| 5  | 10.0 | 91 |    |    | 6  |      |     |     |   |      | 3  |    |
| 7  | 9.0  | 76 |    | 9  | 7  |      | 3.0 |     |   | 0.95 | 5  |    |
| 9  | 5.0  | 78 | 5  | 11 |    |      |     |     |   |      | 6  |    |
| 11 | 5.4  | 86 |    |    | 7  |      |     |     |   |      | 7  |    |
| 3  | 2.1  | 70 | 5  | 5  | 5  | 0.1  | 0.2 | 0.1 | 5 | 0.1  | 5  |    |
| 4  | 2.0  | 90 |    | 10 |    |      |     |     |   |      |    |    |
| 2  | 2    | 88 |    |    |    |      |     | 10  |   |      |    |    |
| 5  | 5    | 78 |    |    | 5  |      |     | 12  |   |      | 5  |    |
| 3  | 8    | 70 | 2  |    | 8  |      |     | 15  |   |      | 5  |    |
| 7  | 10   | 80 |    |    |    |      |     | 8   |   |      | 12 |    |
| 6  | 10   | 80 |    | 10 |    |      |     |     |   |      |    |    |

TABLE 6

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 20 | 2.0  | 80 | 5 |    | 6  | 4  |     |     |    |    | 5  |   |
| 40 | 3.0  | 90 |   | 5  | 5  |    | 0.2 |     |    |    |    |   |
| 17 | 10.0 | 85 | 3 |    | 3  | 3  |     |     |    | 5  | 1  |   |
| 15 | 2.1  | 91 |   | 8  |    |    |     |     |    |    |    | 1 |
| 13 | 3.1  | 86 | 5 |    |    |    |     | 0.2 | 4  |    |    | 5 |
| 14 | 1.1  | 81 |   |    | 9  |    | 0.5 | 0.5 |    |    | 9  |   |
| 15 | 2.5  | 60 | 4 | 15 | 3  | 3  |     |     | 6  | 10 | 5  | 4 |
| 16 | 5    | 65 |   | 20 |    |    |     |     | 10 |    |    |   |
| 1  | 2.4  | 75 | 5 | 4  |    | 5  |     |     |    | 6  |    | 5 |
| 2  | 4.1  | 80 | 3 | 5  | 2  | 10 |     | 0.3 |    |    |    |   |
| 6  | 3.2  | 65 |   | 5  | 4  | 6  |     |     | 5  | 4  | 6  | 5 |
| 9  | 5.1  | 96 |   |    |    |    |     |     |    | 4  |    |   |
| 10 | 10.8 | 90 | 5 |    |    |    |     |     | 5  |    |    |   |
| 11 | 10.0 | 80 | 2 | 6  | 2  | 5  |     |     | 1  |    | 4  |   |
| 12 | 1.8  | 80 |   | 5  |    |    |     |     |    |    | 15 |   |
| 13 | 2.6  | 84 |   |    | 11 |    |     |     |    |    | 5  |   |
| 14 | 3.3  | 80 | 2 |    |    | 10 |     |     |    | 2  |    | 6 |
| 15 | 12.0 | 90 |   |    |    | 7  | 0.3 |     | 3  |    |    |   |
| 16 | 5.4  | 69 | 2 | 20 | 2  | 1  |     |     |    |    | 3  | 3 |
| 17 | 6.0  | 91 |   |    | 4  |    |     |     |    |    | 5  |   |

TABLE 7

| Dye | Dye Content | Water | PG | DEG | NMP | CET | TBT | TDG | BDL | PHO | 2P | PI2 |
|---|---|---|---|---|---|---|---|---|---|---|---|---|
| 18 | 3.0 | 80 | 15 | | | 0.2 | | | | | 5 | |
| 23 | 9.0 | 90 | | 5 | | | | | | 1.2 | | 5 |
| 19 | 1.5 | 85 | 5 | 5 | | 0.15 | 5.0 | 0.2 | | | | |
| 20 | 2.5 | 90 | | 6 | 4 | | | | | 0.12 | | |
| 22 | 3.1 | 82 | 4 | 8 | | 0.3 | | | | | | 6 |
| 21 | 0.9 | 85 | | 10 | | | | | 5 | 0.2 | | |
| 28 | 8.0 | 90 | | 5 | 5 | | | 0.3 | | | | |
| 29 | 4.0 | 70 | | 10 | 4 | | | | 1 | | 4 | 11 |
| 30 | 2.2 | 75 | 4 | 10 | 3 | | | | 2 | | 6 | |
| 31 | 10.0 | 91 | | | 6 | | | | | | 3 | |
| 32 | 9.0 | 76 | | 9 | 7 | | 3.0 | | | 0.95 | 5 | |
| 33 | 5.0 | 78 | 5 | 11 | | | | | | | 6 | |
| 34 | 5.4 | 86 | | | 7 | | | | | | 7 | |
| 35 | 2.1 | 70 | 5 | 5 | 5 | 0.1 | 0.2 | 0.1 | 5 | 0.1 | 5 | |
| 36 | 2.0 | 90 | | 10 | | | | | | | | |
| 37 | 2 | 88 | | | | | | 10 | | | | |
| 38 | 5 | 78 | | | 5 | | | 12 | | | 5 | |
| 39 | 8 | 70 | 2 | | 8 | | | 15 | | | 5 | |
| 40 | 10 | 80 | | | | | | 8 | | | 12 | |
| 41 | 10 | 80 | | 10 | | | | | | | | |

What is claimed is:

1. A mono-azo compound of Formula (1) and salts thereof:

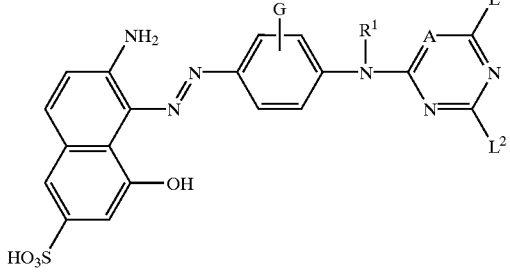

Formula (1)

wherein:

A is N, C—Cl, C—CN or C—$NO_2$;

$R^1$ is H or optionally substituted alkyl;

G is sulpho, carboxy, optionally substituted alkyl, optionally substituted alkoxy, —$CF_3$ or —$PO_3H_2$;

$L^1$ and $L^2$ are each independently —$SR^2$, —$OR^3$ or —$NR^4R^5$;

$R^2$, $R^3$, $R^4$ and $R^5$ are each independently H, optionally substituted alkyl or a group of the Formula (4) or Formula (5)

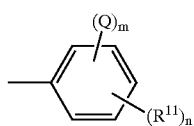

Formula (4)

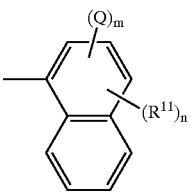

Formula (5)

wherein:
each $R^{11}$ independently is $C_{1-6}$-alkoxy, $C_{1-6}$-hydroxyalkoxy, hydroxy, halo, nitro, amino, —$COC_{1-6}$-alkyl, —$NHCOC_{1-6}$-alkyl or —$NHC_{1-6}$-hydroxyalkyl;
each Q independently is optionally substituted $C_{1-30}$-alkyl or a group of the Formula —Z—$Q^1$;
each Z independently is a divalent linking group;
each $Q^1$ independently is optionally substituted $C_{1-30}$-alkyl;
n is 0 to 5;
m is 1 or 2;
(n+m)=1 to 5;
any optional substituent on $R^2$, $R^3$, $R^4$ and $R^5$ being other than sulphato or vinyl sulphone; or
$R^4$ and $R^5$ together with the nitrogen to which they are attached form an optionally substituted five or six membered ring;
provided that:
(a) $L^1$ and $L^2$ are free from carboxy, sulpho and —$PO_3H_2$ groups;
(b) $L^1$ and $L^2$ are not both —$NH_2$; and
(c) $L^1$ and $L^2$ are not both hydroxyethylamino.

2. A compound according to claim 1 wherein G is attached ortho to the azo group.

3. A compound according to either claim 1 or claim 2 wherein G is sulpho.

4. A compound according to any one of the preceding claims wherein A is N.

5. A compound according to any one of the preceding claims wherein:

$R^2$, $R^3$, $R^4$ and $R^5$ each independently is H or $C_{1-30}$-alkyl optionally substituted by one or more atoms or groups selected from the group consisting of hydroxy, cyano, halo, nitro, $C_{1-6}$-alkoxy, $C_{1-6}$-hydroxyalkoxy, a 5 or 6 membered heterocyclic group, a group represented by T and phenyl optionally substituted by one or more of $C_{1-10}$-alkyl, hydroxy, cyano, halo, nitro, $C_{1-6}$-alkoxy, $C_{1-6}$-hydroxyalkoxy or a group T; or $R^4$ and $R^5$ together with the nitrogen to which they are attached form an optionally substituted morpholinyl, piperazinyl or piperidinyl ring; and T is an optionally substituted amino group.

6. A compound according to claim 1 of the Formula (6) and salts thereof:

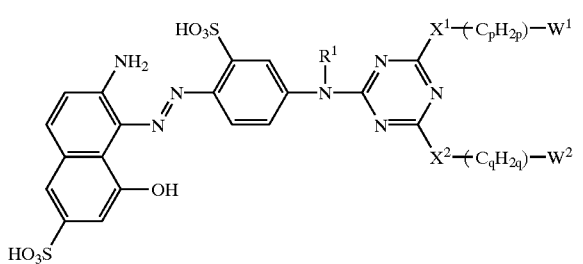

Formula (6)

wherein:

$X^1$ and $X^2$ each independently is —O—, —S— or —NR$^{12}$;

$W^1$ and $W^2$ each independently is H, a group T, —OC$_{1-6}$-alkylene —OR$^{10}$, $C_{1-6}$-alkoxy, hydroxy, a 5 or 6 membered heterocyclic group or phenyl optionally substituted by one or more $C_{1-10}$-alkyl group(s);

$R^{10}$ is H or alkyl optionally substituted by —NH$_2$;

$R^{12}$ is H or $C_{1-20}$-alkyl optionally substituted by hydroxy, $C_{1-4}$-alkoxy; or a group T;

T is an optionally substituted amino group;

p and q each independently is 1 to 20; or $X^1$—($C_pH_{2p}$)$W^1$ and $X^2$—($C_qH_{2q}$)$W^2$ each independently form a piperazine or morpholine ring optionally substituted by $C_{1-4}$-alkyl, hydroxy-$C_{1-4}$-alkyl, —CO($C_{1-4}$-alkyl) or a group of the formula —M—NR$^8$R$^9$;

$R^8$ and $R^9$ each independently is H or $C_{1-6}$-alkyl optionally substituted by hydroxy or $C_{1-6}$-alkoxy;

M is $C_{1-6}$-alkylene; and $R^1$ is optionally substituted alkyl;

provided that:
(a) $W^1$, $W^2$ and $R^{12}$ are free from carboxy, sulpho and —PO$_3$H$_2$ groups; and
(b) the groups —X$^1$—(C$_p$H$_{2p}$)—W$^1$ and —X$^2$—(C$_q$H$_{2q}$)—W$^2$ are not both hydroxyethylamino.

7. A compound according to claim 6 wherein:
$X^1$ and $X^2$ are each independently —NR$^{12}$—; and
$R^{12}$ is as defined in claim 6.

8. A compound according to claim 6 wherein:
$X^1$ and $X^2$ are each independently —NR$^{12}$;
$W^1$ and $W^2$ are each independently H, —NH$_2$, —NR$^{13}$CO(C$_{1-4}$-alkyl), —OC$_{1-6}$-alkane-OH, $C_{1-6}$-alkoxy, morpholinyl or tetrahydrofuranyl;
$R^{13}$ is H or $C_{1-4}$-alkyl; and
$R^{12}$ is as defined in claim 6.

9. A compound according to claim 1 of the Formula (7) or a salt thereof:

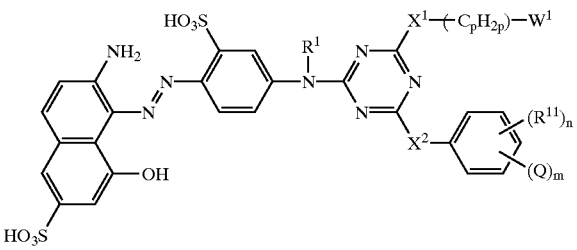

Formula (7)

wherein:

each Q independently is optionally substituted $C_{1-30}$-alkyl or a group of the Formula —Z—Q$^1$;

each Z independently is a divalent linking group;

each Q$^1$ independently is optionally substituted $C_{1-30}$-alkyl;

each $R^{11}$ independently is $C_{1-6}$-alkoxy, $C_{1-6}$-hydroxyalkoxy, hydroxy, halo, nitro, amino, —COC$_{1-6}$-alkyl, —NHCOC$_{1-6}$-alkyl or —NHC$_{1-6}$-hydroxyalkyl;

m is 0 to 5;

n is 0 to 5;

(n+m)=0 to 5;

p is 1 to 20; and $R^1$, is optionally substituted alkyl, $W^1$ and $W^2$ each independently is H, a group T, —OC$_{1-6}$-alkylene —OR$^{10}$, $C_{1-6}$-alkoxy, hydroxy, a 5 or 6 membered heterocyclic group or phenyl optionally substituted by one or more $C_{1-10}$-alkyl group(s);

$X^1$ and $X^2$ each independently is —O—, —S— or —NR$^{12}$;

provided that $W^1$, $X^1$, $X^2$ and each Q are free from carboxy, sulpho and —PO$_3$H$_2$ groups.

10. A compound according to claim 9 wherein:
$R^1$ is H or $C_{1-4}$-alkyl;
$X^1$ and $X^2$ each independently is —S— or —NR$^{12}$;
$W^1$ is H, tetrahydrofuranyl, —OH, phenyl or phenyl substituted by one or more $C_{1-4}$-alkyl group(s);
each Q independently is $C_{1-20}$-alkyl;
$R^{12}$ is H or $C_{1-20}$-alkyl optionally substituted by hydroxy;
n is 0 or 1; and
p is 1 to 20.

11. A compound according to claim 9 wherein:
$R^1$ is H or $C_{1-4}$-alkyl;
$W^1$ is H;
n is 0; and
each Q independently is $C_{1-4}$-alkyl.

12. A compound according to any one of claims 9 to claim 11 wherein p is 5 to 20.

13. A compound according to claim 1 wherein:
G is —SO$_3$H and is attached ortho to the azo group;
$L^1$ and $L^2$ each independently is —NHR$^{14}$;
$R^{14}$ is $C_{1-30}$-alkyl optionally substituted by two or more —OH groups; and
$R^1$ is H or $C_{1-4}$-alkyl.

14. A compound according to any one of the previous claims in the form of an alkali metal, ammonium or substituted ammonium salt.

15. An ink comprising:
(a) from 0.01 to 30 parts of a compound of the Formula (9); and
(b) from 70 to 99.99 parts of a medium comprising a mixture of water and an organic solvent, an organic solvent free from water, or a low melting point solid; wherein all parts are by weight and the number of parts of (a)+(b)=100:

Formula (9)

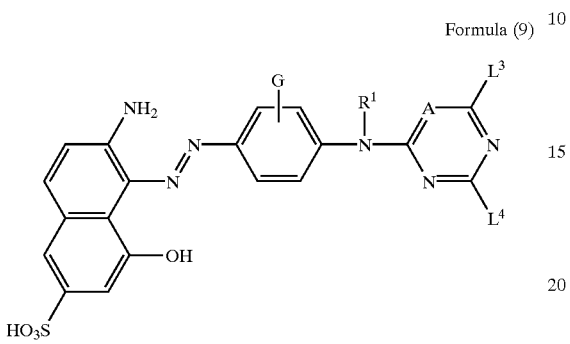

wherein:
$L^3$ is $L^1$ or a labile atom or group;
$L^4$ is $L^2$ or a labile atom or group;
A, $R^1$, G, $L^1$ and $L^2$ are as defined in claim 1;
provided that:
(a) $L^3$ and $L^4$ are free from carboxy, sulpho and $-PO_3H_2$ groups; and
(b) $L^3$ and $L^4$ are not both hydroxyethylamino.

16. A process for printing an image on a substrate comprising applying thereto an ink containing a compound of the Formula (9)

Formula (9)

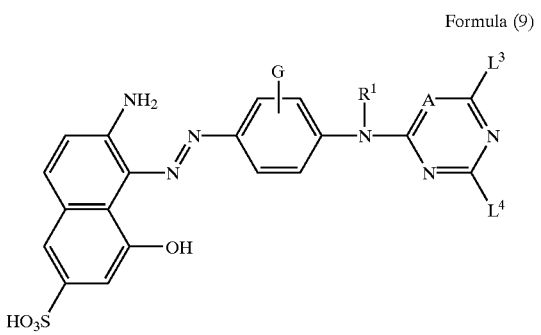

wherein:
$L^3$ is $L^1$ or a labile atom or group;
$L^4$ is $L^2$ or a labile atom or group;
A, is N, C—Cl, C—CN or C—$NO_2$;
$R^1$ is H or optionally substituted alkyl;
G is sulpho, carboxy, optionally substituted alkyl, optionally substituted alkoxy, —$CF_3$ or —$PO_3H_2$;
$L^1$ and $L^2$ are each independently —$SR^2$, —$OR^3$ or —$NR^4R^5$;
provided that:
(a) $L^3$ and $L^4$ are free from carboxy, sulpho and —$PO_3H_2$ groups; and
(b) $L^3$ and $L^4$ are not both hydroxyethylamino, by means of an ink jet printer.

17. A process according to claim 16 wherein the ink comprises (a) from 0.01 to 30 parts of the compound of Formula (9); and (b) from 70 to 99.99 parts of a medium comprising a mixture of water and an organic solvent, an organic solvent free from water, or a low melting point solid; wherein all parts are by weight and the number of parts (a)+(b)=100.

18. A paper, an overhead projector slide or a textile material printed with an ink according to claim 15.

19. An ink jet printer cartridge containing an ink, wherein the ink contains a compound of the Formula (9)

Formula (9)

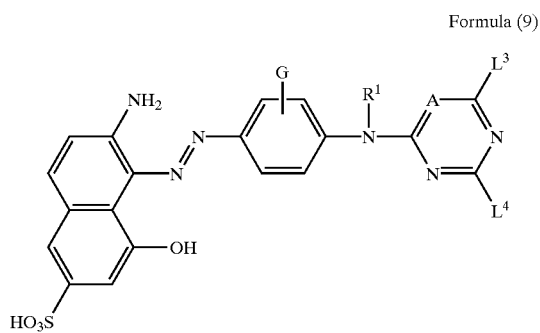

wherein:
$L^3$ is $L^1$ or a labile atom or group;
$L^4$ is $L^2$ or a labile atom or group;
A, is N, C—Cl, C—CN or C—$NO_2$;
$R^1$ is H or optionally substituted alkyl;
G is sulpho, carboxy, optionally substituted alkyl, optionally substituted alkoxy, —$CF_3$ or —$PO_3H_2$;
$L^1$ and $L^2$ are each independently —$SR^2$, —$OR^3$ or —$NR^4R^5$;
provided that:
(a) $L^3$ and $L^4$ are free from carboxy, sulpho and —$PO_3H_2$ groups; and
(b) $L^3$ and $L^4$ are not both hydroxyethylamino.

20. A paper, an overhead projector slide or a textile material printed by means of a process according to claim 16.

* * * * *